E. R. EVANS.
INTERCHANGE SPEED GEAR MECHANISM FOR AUTOMOBILES.
APPLICATION FILED NOV. 5, 1913.
1,117,013. Patented Nov. 10, 1914.
5 SHEETS—SHEET 1.
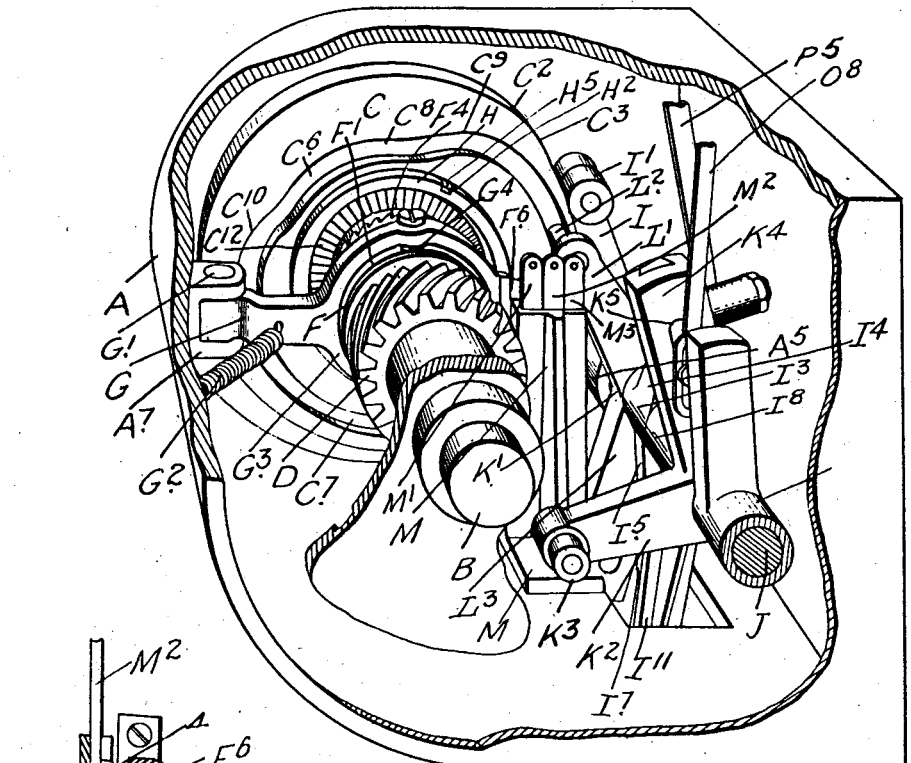
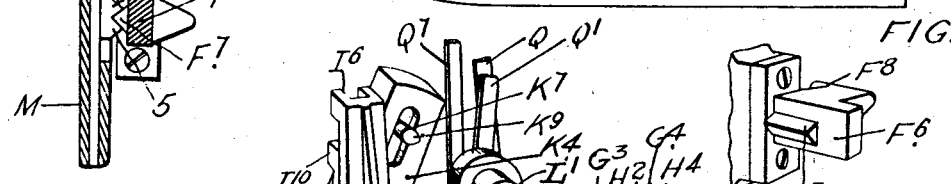
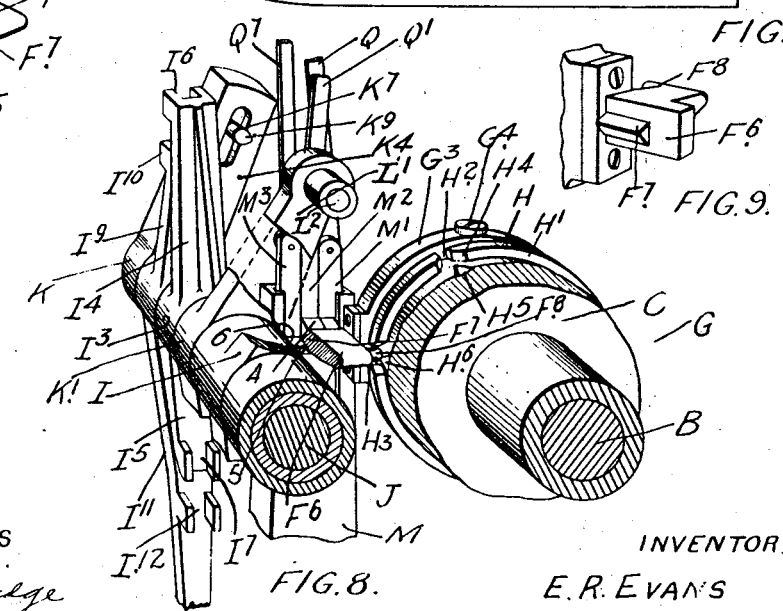
WITNESSES
INVENTOR.
E. R. Evans
by Fred. B. Fetherstonhaugh
atty.

E. R. EVANS.
INTERCHANGE SPEED GEAR MECHANISM FOR AUTOMOBILES.
APPLICATION FILED NOV. 5, 1913.

1,117,013.

Patented Nov. 10, 1914.
5 SHEETS—SHEET 2.

WITNESSES

INVENTOR
E. R. EVANS

E. R. EVANS.
INTERCHANGE SPEED GEAR MECHANISM FOR AUTOMOBILES.
APPLICATION FILED NOV. 5, 1913.
1,117,013.
Patented Nov. 10, 1914.
6 SHEETS—SHEET 3.
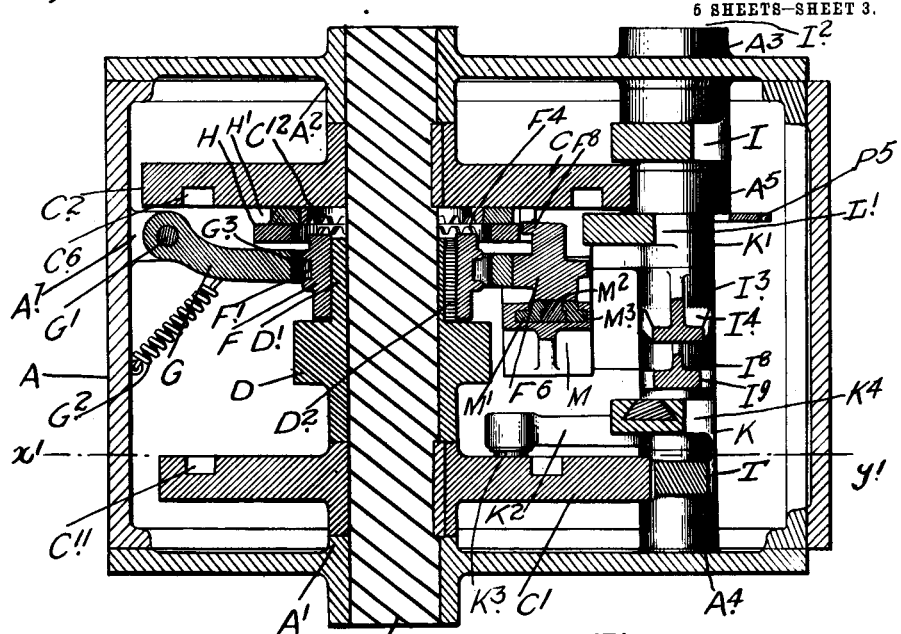
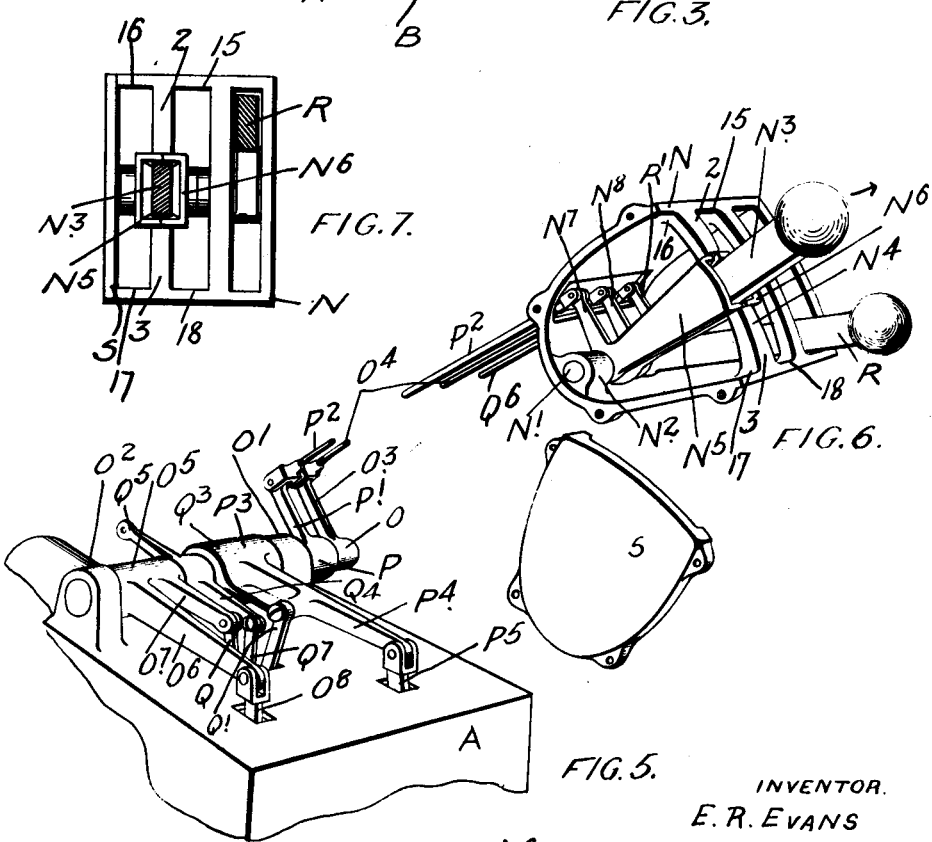
INVENTOR.
E. R. EVANS E. R. EVANS.
INTERCHANGE SPEED GEAR MECHANISM FOR AUTOMOBILES.
APPLICATION FILED NOV. 5, 1913.

1,117,013.

Patented Nov. 10, 1914.

5 SHEETS—SHEET 4.

WITNESSES

INVENTOR.
E. R. EVANS
by Fred B. Fetherstonhaugh atty

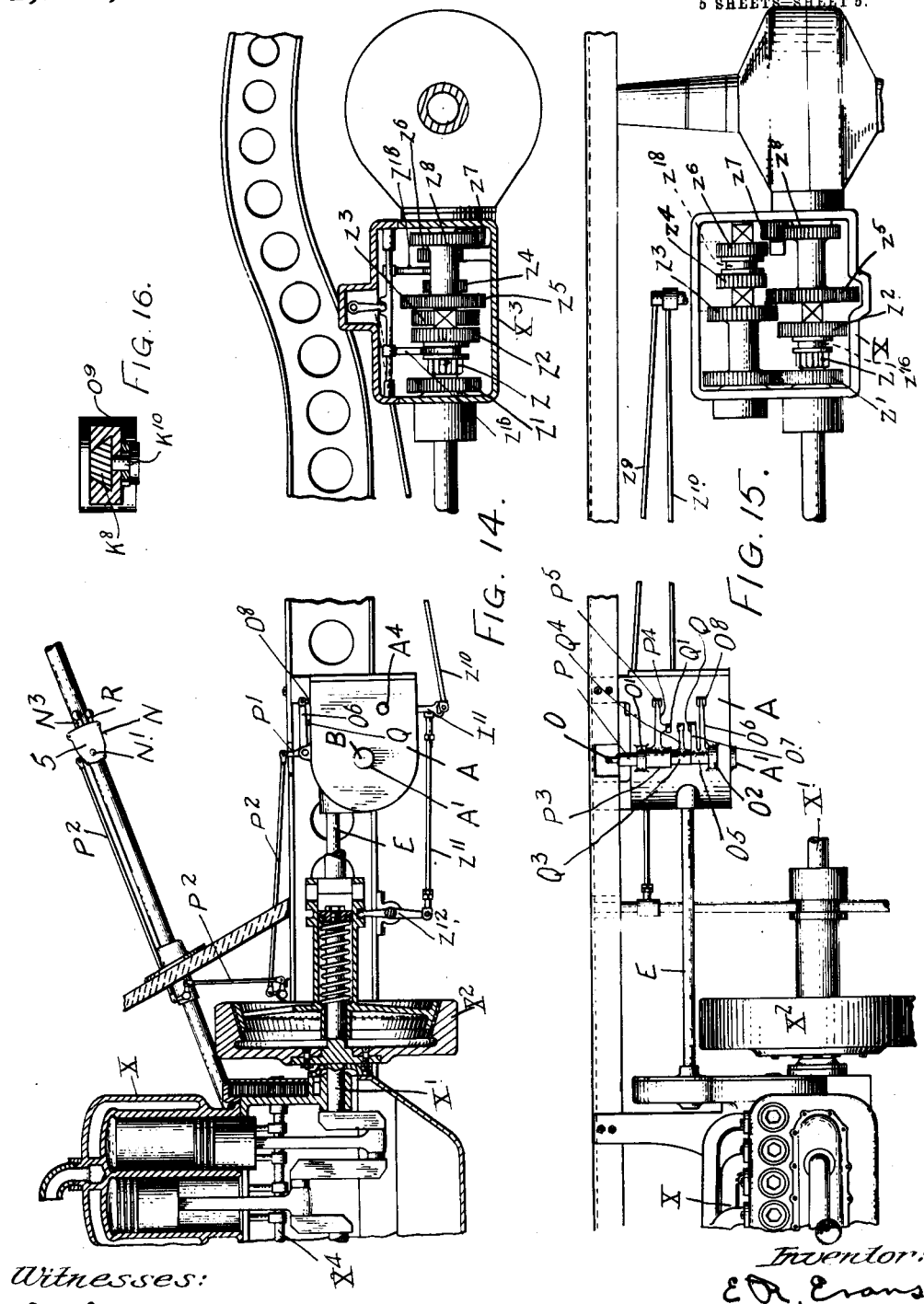

UNITED STATES PATENT OFFICE.

EDWIN RAWDEN EVANS, OF ORILLIA, ONTARIO, CANADA.

INTERCHANGE-SPEED-GEAR MECHANISM FOR AUTOMOBILES.

1,117,013.   Specification of Letters Patent.   Patented Nov. 10, 1914.

Application filed November 5, 1913. Serial No. 799,373.

*To all whom it may concern:*

Be it known that I, EDWIN RAWDEN EVANS, of the town of Orillia, in the county of Simcoe, in the Province of Ontario, Canada, have invented certain new and useful Improvements in Interchange-Speed-Gear-Mechanisms for Automobiles, of which the following is the specification.

My invention relates to improvements in interchange speed gear mechanisms for automobiles and the like and the object of the invention is to devise an interchange speed gear mechanism which may be operated from the engine shaft and which mechanism may be thrown into operative connection with the engine shaft with a minimum amount of manual labor and it consists essentially of the following arrangement and construction of parts.

Figures 2, 12, 13:
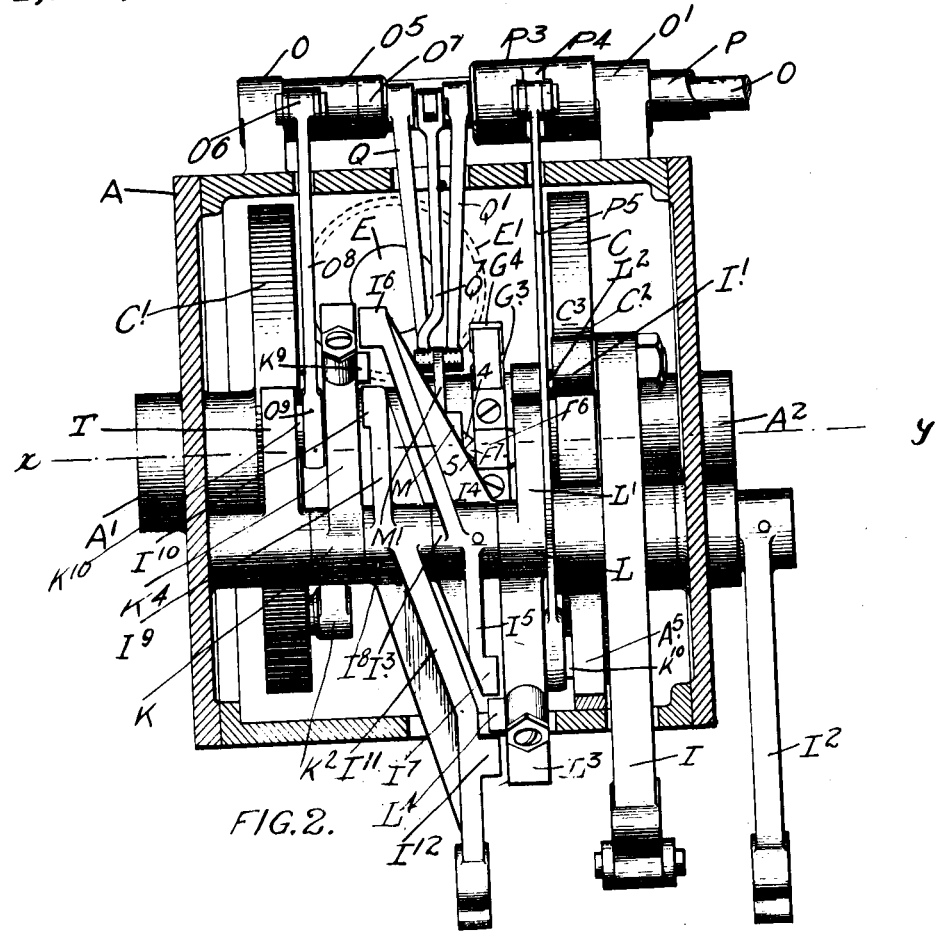
Figure 4:
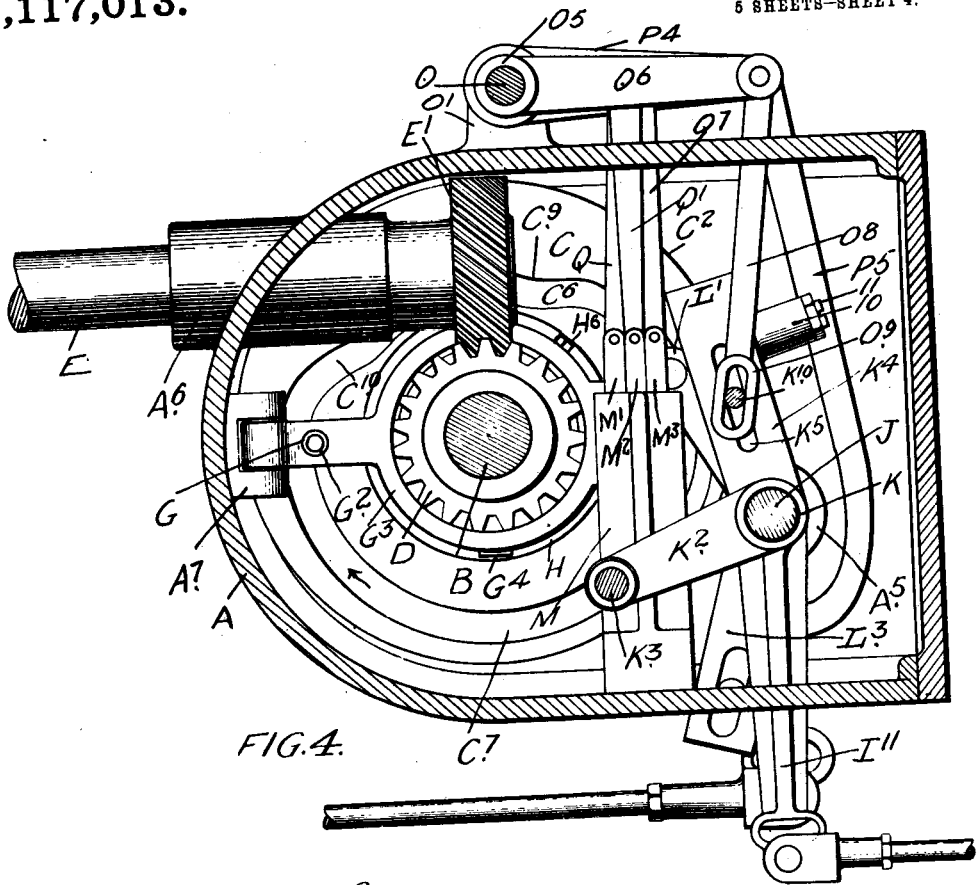
Figure 11:
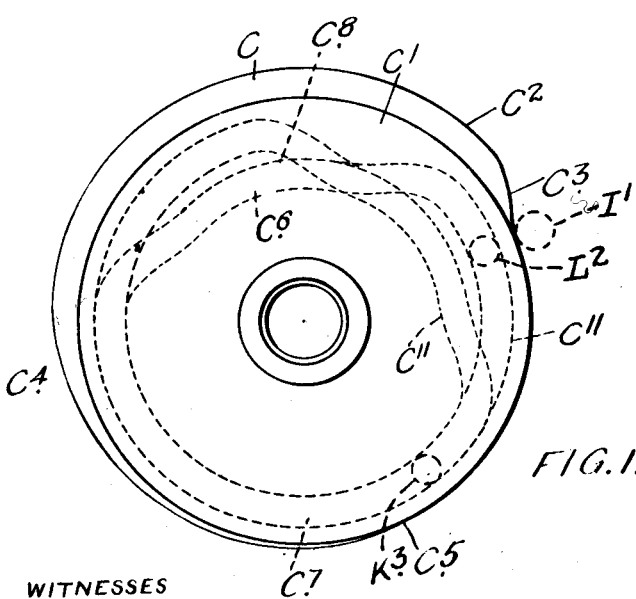

Figure 1, is a general perspective view of my device with the casing thereof partially broken away and in section. Fig. 2, is an end elevation of the parts shown in Fig. 1 with the casing in section. Fig. 3, is a plan section on line $x$—$y$ Fig. 2. Fig. 4, is a longitudinal section on line $x'$—$y'$ Fig. 3. Figs. 5 and 6 are diminutive views showing the connection of the parts shown in Figs. 1, 2, 3 and 4 with the operating levers thereof, the end plate being removed. Fig. 7, is a front sectional elevation of the parts shown in Fig. 6. Fig. 8, is a perspective detail of a portion of the operating mechanism looking from the opposite side to that shown in Fig. 1. Fig. 9, is a perspective detail of the supplemental clutch operating finger. Fig. 10, is a vertical section of a portion of the supplemental clutch operating mechanism. Fig. 11, is a side elevation of the operating cams. Fig. 12, is a detail of the locking arm. Fig. 13, is a sectional detail of one of the interchange clutch operating engaging fingers. Fig. 14 is an elevation partly in section showing my mechanism applied to the ordinary driving mechanism of an automobile. Fig. 15, is a plan view of the parts shown in Fig. 14. Fig. 16 is a sectional view through Fig. 13 on line $x^7$—$y^7$.

In the drawings like letters of reference indicate corresponding parts in each figure.

A is the main casing provided with main bearings $A'$ and $A^2$ and the supplemental bearings $A^3$ and $A^4$ and the bearing standard $A^5$.

B is the main shaft mounted in bearings $A'$ and $A^2$.

C and $C'$ are cams mounted on the shaft B. The cam C is provided with a peripheral cam surface $C^2$, the radius of which has a quick increase at $C^3$ and a gradual decrease from about the point $C^4$ to the point $C^5$. The cam C is also provided with a face groove $C^6$ having a major concentric portion $C^7$ and a minor concentric portion $C^8$ and connecting portions $C^9$ and $C^{10}$. The cam $C'$ is provided with a similar face groove $C^{11}$ set in a different position to the face groove $C^5$ as indicated by dotted lines in Fig. 11. The outer periphery of the cam $C'$ is plane periphery concentric at all points with the center of the shaft B.

D is a miter gear loosely mounted on the shaft B. The casing A is also provided with a bearing $A^6$ through which the shaft E, driven from the cam shaft $x^4$ extends. The shaft E may be driven either directly from the engine shaft or from the cam shaft. The inner end of the shaft E is provided with a miter gear $E'$ meshing with the gear D. It will be understood that the gear D is, therefore, continuously driven from the engine shaft.

$D'$ is the hub of the gear D provided with a feather key $D^2$.

F is a clutch sleeve slidably mounted upon the hub $D'$ and slidably connected thereto by the key $D^2$. The clutch sleeve F is provided with an annular groove $F'$.

G is the clutch operating arm pivoted at $G'$ to the lug $A^7$ extending from the wall of the casing A. The clutch arm G is connected by a suitable tension spring $G^2$ to a suitable portion of the casing.

$G^3$ is a yoke forming part of the clutch arm G. The yoke $G^3$ extends around the clutch sleeve F and is provided with diametrically opposed projections formed by the screws $G^4$ which extend into the clutch sleeve groove $F'$. The clutch sleeve F is provided with an annular tooth engaging end $F^4$.

$C^{12}$ is an annular tooth engaging surface opposing the tooth portion of the clutch sleeve F. To the free end of the clutch arm G is secured a clutch engaging member $F^5$ carrying a triangular horizontal tooth $F^7$ and an L-shaped engaging finger $F^6$ (see Figs. 3 and 9) for a purpose which will hereinafter appear.

H is an annular ring provided with an inner reduced portion $H'$ forming an annular groove. The ring H is suitably secured to the inner face of the cam C.

$H^2$ and $H^3$ are two openings formed in the wall of the groove $H'$, such openings having a flared inner portion $H^4$ as shown particularly in Fig. 8.

$H^5$ and $H^6$ are throw-out projections secured to and forming part of the cam C and located opposite the openings $H^2$.

I is the engine clutch arm. The arm I is swung upon the supplemental shaft J journaled in the bearings $A^4$ and $A^3$ of the casing and the supplemental bearing $A^5$. The lower end of the arm I is suitably connected to the engine or main clutch $X^2$. The upper end of the arm is provided with a follower roller $I'$ bearing against the periphery of the cam C.

$I^2$ is an arm secured to the supplemental shaft J. The arm $I^2$ is connected to the reverse and intermediate gear shifts of the main gear mechanism.

$I^3$ is a sleeve connected to the supplemental shaft J and provided with an upwardly extending inclined arm $I^4$ and a downwardly extending arm $I^5$. The arm $I^4$ is provided at its upper end with a vertically channeled portion $I^6$ opposing the cam $C'$. The arm $I^5$ is provided with a vertically channeled portion $I^7$ opposing the cam C.

$I^8$ is a sleeve mounted loosely upon the shaft J and provided with an upwardly extending arm $I^9$ having a vertically channeled portion $I^{10}$ opposing the cam $C'$ and a downwardly inclined arm $I^{11}$ having a vertically channeled portion $I^{12}$ opposing the cam C.

It will be understood that the vertically channeled portions $I^6$ and $I^{10}$ are located in the same vertical plane and the channeled portions $I^7$ and $I^{12}$ are located in the same vertical plane.

K is a sleeve loosely mounted upon the shaft J. The sleeve K is provided with a downwardly inclined arm $K^2$ having a follower $K^3$ engaging the cam groove $C^{11}$, of the cam $C'$.

$K^4$ is an arm extending upwardly from the sleeve K and provided with front and back longitudinal slots $K^5$ and $K^7$ and a central recess $K^6$ (see Fig. 13).

$K^8$ is a movable piece slidably held within the recess $K^6$ provided with a projection $K^9$ extending through the slot $K^7$ and headed screw pin $K^{10}$ extending through the slot $K^5$. Normally the projection $K^9$ is located in circumferential alinement with the space intervening between the portions $I^6$ and $I^{10}$.

L is a sleeve also mounted upon the shaft J and provided with an upwardly extending arm $L'$ having a follower $L^2$ extending into the cam groove $C^6$ of the cam C. The sleeve L is also provided with a depending arm $L^3$ similar in construction to the arm $K^4$.

M is a vertical slide way supported on the bottom of the casing A and carrying slides $M'$, $M^2$ and $M^3$.

N is an H-plate (see Fig. 6) of ordinary construction carried in the usual way by the steering column.

$N'$ is a rocking rod carried by the bearings $N^2$.

$N^3$ is an operating lever swung upon the rocking rod $N'$ and located in the neutral position between the ends 2 and 3 of the divided cross bar $N^4$.

$N^5$ and $N^6$ are supplemental levers swung upon the rocking bar $N'$ and having recessed opposing faces. Each of the supplemental levers $N^5$ and $N^6$ are provided with forwardly extending arms $N^7$ and $N^8$.

O is the main operating rocking rod supported in bearings $O'$ and $O^2$ (see Fig. 5) carried by the top of the casing A.

$O^3$ is an arm extending from the rocking shaft O.

$O^4$ is a link connecting the arm $O^3$ with the arm $N^8$.

$O^5$ is a sleeve secured to the rocking shaft O and provided with forwardly extending arms $O^6$ and $O^7$.

$O^8$ is a link pivotally connected to the outer end of the arm $O^6$ and provided with an enlarged slotted lower end $O^9$ through which the screw pin $K^{10}$ extends in its normal position centrally of the slot. The lower end of the arm $L^3$ is similarly slotted and recessed to the upper end of the arm $K^4$ and provided with a projection $L^4$ (see Fig. 2) similar to the projection $K^9$ carried by the arm $K^4$.

P is a sleeve rotatably mounted on the rocking shaft O and provided with outwardly extending arm $P'$ connected by a link $P^2$ to the arm $N^7$ of the lever $N^5$. The opposite end of the sleeve P is provided with an enlargement $P^3$ from which extends an arm $P^4$.

$P^5$ is a link pivotally connected at one end to the arm $P^4$ and provided at the opposite end with an enlarged slotted portion similar to the slotted end $O^9$ of the link $O^8$, such slotted end being connected to the projection $L^4$ similarly to the connection between the slotted end $O^9$ and the pin $K^{10}$.

The slides $M'$ and $M^2$ are provided with projections 4 and 5. These projections are V-shaped in form and have an intervening V-space into which the projection $F^7$ fits when the parts are in their neutral position. The slide $M^3$ is provided with a single enlargement 6 for a purpose which will hereinafter appear.

Q and $Q'$ are links. The link bar Q is connected at one end to the arm $O^7$ and at the opposite end to the slide $M'$. The link bar $Q'$ is connected at one end to the arm $P^4$ intermediately of its length and at the opposite end to the slide bar $M^2$.

$Q^3$ is a sleeve loosely mounted upon the shaft O provided with outwardly extending arms $Q^4$ and $Q^5$.

R is a supplemental lever swung upon the shaft N' and provided with an outwardly extending arm R' connected by the link $Q^6$ to the arm $Q^5$.

$Q^7$ is a link connecting the arm $Q^4$ with the slide $M^3$.

It will be understood that the levers $N^3$, $N^5$ and $N^6$ are spring levers whereby the lever $N^3$ may be sprung into engagement with either the lever $N^5$ or $N^6$ and the lever $N^5$ or $N^6$ thereby sprung free of the opening between the portions 2 and 3 of the cross bar $N^4$.

In order to prevent too free a movement of the slide $K^8$ I form recesses 7, 8 and 9 therein corresponding to the three positions thereof that is the central or neutral position and the upper and lower positions which it assumes.

10 is a hollow boss extending from the arm $K^4$ provided with an internally threaded outer end into which is screwed a plug 11.

12 is a compression spring and 13 the ball which fits into one of the recesses 7, 8 and 9 and is held therein by the compression spring 12.

S is the end plate of the H-plate N.

In Figs. 14 and 15 I show my device as applied to the driving mechanism of an automobile. In these figures X is an engine, X' the engine shaft, $X^2$ the main clutch and $X^3$ the transmission gear box provided with the usual high speed gears Z and Z', intermediate gears $Z^2$ and $Z^3$, low speed gears $Z^4$ and $Z^5$ and reverse gears $Z^6$, $Z^7$ and $Z^8$.

The arms $I^{11}$ and $I^2$ are connected by links $Z^9$ and $Z^{10}$ respectively to the forks operating the interchange speed gears of the transmission mechanism. The arm I is connected by a link $Z^{11}$ to the operating mechanism $Z^{12}$ of the main clutch.

Having described the principal parts involved in my invention I will briefly describe the operation of the same.

When the mechanism is in the normal position, that is, to say, when the automobile is in the shed for instance, the engine clutch is in engagement. The first operation necessary is to throw the engine clutch out of engagement. In order to do this I throw the lever R upwardly into the position shown in Fig. 7 depressing the opposite end R' and the arm $Q^5$ through the link $Q^6$. This operation raises the arm $Q^4$ pulling upon the link $Q^7$ connected to the slide $M^3$. As before stated the slide $M^3$ is provided with one projection 6 as shown in Fig. 8 of the drawings. On the upward movement of the slide $M^3$ the projection 6 engages with the tooth $F^7$ supported by the member $F^6$ connected to the yoke $G^3$ of the clutch arm G. By this means the clutch arm G is swung slightly inwardly carrying the sleeve F and teeth $F^4$ thereof into engagement with the teeth $C^{12}$ and simultaneously carrying the projection $F^8$ into the groove H'.

As before stated the gear D connected to the clutch sleeve F is driven continuously from the cam or engine shaft through the gear E'. It will, therefore, be seen that as soon as the clutch teeth $F^4$ and $C^{12}$ are thrown into engagement that the cam C revolves. Immediately the cam C begins to revolve the follower I' mounts up upon the peripheral cam portion $C^3$ thereby throwing the engine clutch lever I in the required direction pull on the link $Z^{11}$ to throw out the engine clutch. It will also be seen as soon as the cam begins to revolve that the projection $F^8$ is carried into the groove H' holding the clutch teeth $F^4$ and $C^{12}$ in positive engagement until the projection $F^8$ strikes the throw-out projection $H^5$ which carries the projection $F^8$ into the opening $H^2$ allowing the clutch lever G to swing back into its normal position carrying the tooth $F^7$ between the projections 4 and 5 of each of the slides M' and $M^2$. Simultaneously the follower rollers $L^2$ and $K^3$ are carried into that portion of the cam groove $C^8$ which is the shortest point in the cam radius. This operation swings the arms $L^3$ and $K^4$ so as to carry the projection $K^9$ into vertical alinement with the vertically channeled portions $I^6$ and $I^{10}$ located opposite the arms $K^4$ and the projection $L^4$ into the vertically channeled portions $I^7$ and $I^{12}$ located opposite the arm $L^3$, that is to say, the projections $K^9$ are carried into position in vertical alinement with the portions $I^6$ and $I^{10}$ and in between such portions and the projection $L^4$ into a position in vertical alinement with the portions $I^7$ and $I^{12}$ and in between such portions. When this operation is accomplished the lever $N^3$ is pressed in either one direction or the other to engage with the channeled lever $N^6$ or channeled lever $N^5$.

We will assume for the purpose of explanation that it is desired to throw the change gear mechanism into the intermediate position. In order to do this the lever $N^3$ is pressed so as to be sprung in the direction of arrow into engagement with the channeled lever $N^6$ which is also sprung into the same direction from between the opening intervening between the bar portions 2 and 3. The lever $N^3$ is then thrown upwardly into the inverted U-shaped recess formed at 15. This operation throws the arm $N^8$ downwardly and the arm $O^8$ connected to the arm $N^8$ by the link $O^4$ also downwardly thereby rocking the main operating rocking rod O. As before described the sleeve $O^5$ and arms $O^7$ and $O^6$ are all connected to the rocking rod O and, therefore, by this operation the arms $O^6$ and $O^7$ are thrown upwardly. During the initial upward movement of the arms $O^6$ and $O^7$ the slotted end of the link $O^8$ merely slides past the screw $K^{10}$ being inoperative during this initial movement. During this movement of the link $O^8$ the link Q carries the projection 5 of the slide bar $M^2$ into engagement with the tooth $F^7$ again throwing the clutch arm forwardly toward the cam C so as to carry the clutch teeth $F^4$ and $C^{12}$ again into engagement and the projection $F^8$ free of the opening $H^2$ into the groove $H'$ to the opposite side of the projection $H^5$ to that which it assumed during the previous operation. By this operation the cams C and $C'$ are again driven rotating in the direction of arrow (see Fig. 11). Immediately this movement has been accomplished the slotted end $O^9$ of the link $O^8$ engages the screw $K^{10}$ carrying the screw upwardly and the projection $K^9$ into engagement with the U-shaped channel $I^6$ of the arm $I^4$ thereby rocking the shaft J to which the arm $I^4$ is connected thereby operating the arm $I^2$ connected by the link $Z^9$ and coacting mechanism to the fork $Z^{16}$ to carry the intermediate gear $Z^2$ and $Z^3$ into engagement. Simultaneously the projection $F^8$ travels around the groove $H'$ until it strikes the projection $H^6$ which carries it into the opening opposite the projection $H^6$ throwing out the cam clutch. To complete the operation the follower roller $I'$ of the main clutch lever I gradually descends on the peripheral cam from the point $C^4$ to the point $C^5$ thereby gradually throwing the engine clutch into engagement.

If it is desired to throw the engine from the intermediate position to the high or low position or the reverse position, such position being indicated by the numerals 16, 17 and 18 in Figs. 6 and 7 the engine clutch is again thrown out automatically when bringing $N^3$ to neutral the lever arm $N^6$ being carried downwardly to the central or neutral position when it may be either carried directly to the reverse position or the lever $N^3$ sprung into engagement with the lever $N^5$. It may then be carried either into the position 16 or the position 17 to engage either the high or low gear operating levers. If it is carried into the high position 16 such operation moves the projection $L^4$ into engagement with the channel $I^7$ of the lever $I^2$ in the reverse $I^5$ thereby moving the lever $I^2$ in the reverse direction to that above described carrying the high gear into mesh by drawing on the link $Z^9$ and fork $Z^{16}$ to carry the gear $Z'$ into internal engagement with the gear Z. If it is carried into the position 17 or the low position the projection $L^4$ is carried into engagement with the channel $I^{12}$ thereby operating the arm $I^{11}$ to draw on the link $Z^{10}$ and fork $Z^{18}$ carrying the gears $Z^4$ and $Z^5$ into engagement. If the reverse position is required the levers $N^3$ and $N^6$ are carried into the position 18 carrying the projection $L^9$ into engagement with the channeled portion $I^{10}$ of the lever $I^9$ thereby carrying the arm $I^{11}$ in the opposite direction and pushing the fork $Z^{18}$ to carry the gear $Z^6$ into engagement with the gear $Z^7$.

In order to prevent the lever $N^3$ being operated except when the projections $K^9$ and $L^4$ are in neutral relation with the channeled portions $I^6$ and $I^{10}$ and $I^7$ and $I^{12}$ I provide the stationary arm T having a vertically slotted portion $T'$ having three horizontal branches $T^2$, $T^3$ and $T^4$. Each screw head $K^{10}$ is provided with a projection $T^5$ extending into the slot $T'$. When the parts are in their neutral position the projection $T^5$ can slide upwardly or downwardly in the vertical portion $T'$ but if when the projection is in the upper, lower or intermediate position then the arms $K^4$ and $L^3$ are out of their neutral position such projection will extend into one of the branches $T^2$, $T^3$ and $T^4$ of the slot $T'$ as shown by the dotted lines in Fig. 12.

Although I show my device as operated from the main shaft of the engine it will, of course, be understood that it could be operated from any other suitably driven shaft as may be found convenient.

What I claim as my invention is.

1. In an interchange speed gear mechanism, the combination with the engine shaft, and plurality of change gear operating levers, of means adapted to be thrown in and out of connection with the engine shaft for operating any one of the aforesaid levers, as and for the purpose specified.

2. In an interchange speed gear mechanism, the combination with the engine shaft and plurality of change gear operating levers, of means adapted to be thrown in and out of connection with the engine shaft for operating any of the aforesaid levers, and an independently operated lever selecting device whereby the lever desired is placed in operative connection with the engine shaft, as and for the purpose specified.

3. In an interchange speed gear mechanism, the combination with the engine shaft and plurality of change gear operating levers, of means adapted to be thrown in and out of connection with the engine shaft for operating any of the aforesaid levers, and means for initially throwing the engine clutch out of connection, as and for the purpose specified.

4. In an interchange speed gear mechanism, the combination with the engine shaft, and plurality of change gear operating levers, of means adapted to be thrown in and out of connection with the engine shaft for operating any of the aforesaid levers, an independently operated lever selecting device whereby the lever desired is placed in operative connection with the engine shaft, and means for initially throwing the engine clutch out of engagement, as and for the purpose specified.

5. In an interchange speed gear mechanism, the combination with the engine shaft, and a plurality of change gear operating levers, of means adapted to be thrown in and out of connection with the engine shaft for operating any of the aforesaid levers, an independently operated lever selecting device whereby the lever desired is placed in operative connection with the engine shaft, and means for initially throwing the engine clutch out of connection, and automatic means for again throwing the engine clutch into gradual engagement, as and for the purpose specified.

6. In an interchange speed gear mechanism, the combination with the engine shaft having a suitable driving gear secured thereto, of a cam shaft, cams mounted thereon, a gear loosely mounted on the cam shaft and meshing with the engine shaft gear, a clutch connection between the loose gear and cam, a suitably mounted supporting shaft, gear change levers mounted thereon, a cam operated lever also mounted on the supporting shaft, and means operated from the driver's seat for first throwing the cam clutch into connection and for then throwing the engaging means between one of the cam operated levers and one of the gear change levers into connection, as and for the purpose specified.

7. In an interchange speed gear mechanism, the combination with the engine shaft having a suitable driving gear secured thereto, of a cam shaft, cams mounted thereon, a gear loosely mounted on the cam shaft and meshing with the engine shaft gear, a clutch connection between the loose gear and cam, a pivoted clutch arm having a projecting engaging portion at its free end, a vertically movable slide having a co-acting engaging projection, means for moving the slide vertically operated from the driver's seat whereby the projection of the slide and the projections of the lever arm are brought into connection to move the clutch lever and clutch inwardly into connection, a plurality of suitably mounted change gear operating levers, swingable means operated from the aforesaid cam, and independently operated means for throwing the swingable means into connection with any one of the required change gear operating levers, as and for the purpose specified.

8. In an interchange speed gear mechanism, the combination with the engine shaft and plurality of change gear operating levers, and a suitable supporting shaft for the change gear levers, a swingable cam operated lever mounted on the change gear lever supporting shaft, a movable engaging member carried by the swingable lever and a hand lever, and means operated by the hand lever for throwing the cam operating means into connection with the engine shaft and the movable member into connection with one of the change gear operating levers, as and for the purpose specified.

9. In an interchange speed gear mechanism, the combination with the engine shaft, and a plurality of change gear operating levers, of means operated by the engine shaft adapted to be thrown in and out of connection therewith for operating any of the aforesaid levers, an independently operated lever selecting device whereby the lever desired is placed in operative connection with the engine shaft, automatic means for initially throwing the engine clutch out of connection, automatic means for again throwing the engine clutch into gradual connection and automatic means for finally throwing the lever operating mechanism out of connection with the engine shaft, as and for the purpose specified.

10. In an interchange speer gear mechanism, a pair of revolving cams driven from the engine shaft, a co-acting bell crank engaging each cam, a lever swung intermediately of its length and provided with end forks, a movable projection carried by each bell crank, and manually operated means for throwing the same in and out of connection with the fork, as and for the purpose specified.

11. In an interchange speed gear mechanism, a pair of revolving cams driven from the engine shaft, a co-acting bell crank engaging each cam, a rocking shaft, a lever swung thereon intermediately of its length and having forked ends, and a lever secured thereon intermediately of its length also having forked ends, the ends of the upwardly extending portions being in proximity to one bell crank lever and the ends of the downwardly extending portions being in proximity to the other bell crank lever, a movable engaging projection carried by each bell crank and means for moving the projection of one bell crank into connection with either of the forked ends of upwardly extending lever portions and means for moving the projection of the other bell crank lever into connection with either of the forked ends of the downwardly extending lever arms, as and for the purpose specified.

EDWIN RAWDEN EVANS.

Witnesses:
LOUISE V. BRIGGS,
MARION BRADY.